J. P. BENNETT & M. M. ROBB.
MACHINE FOR BOXING MATCHES.
APPLICATION FILED MAR. 22, 1915.
1,175,521.
Patented Mar. 14, 1916.
7 SHEETS—SHEET 1.
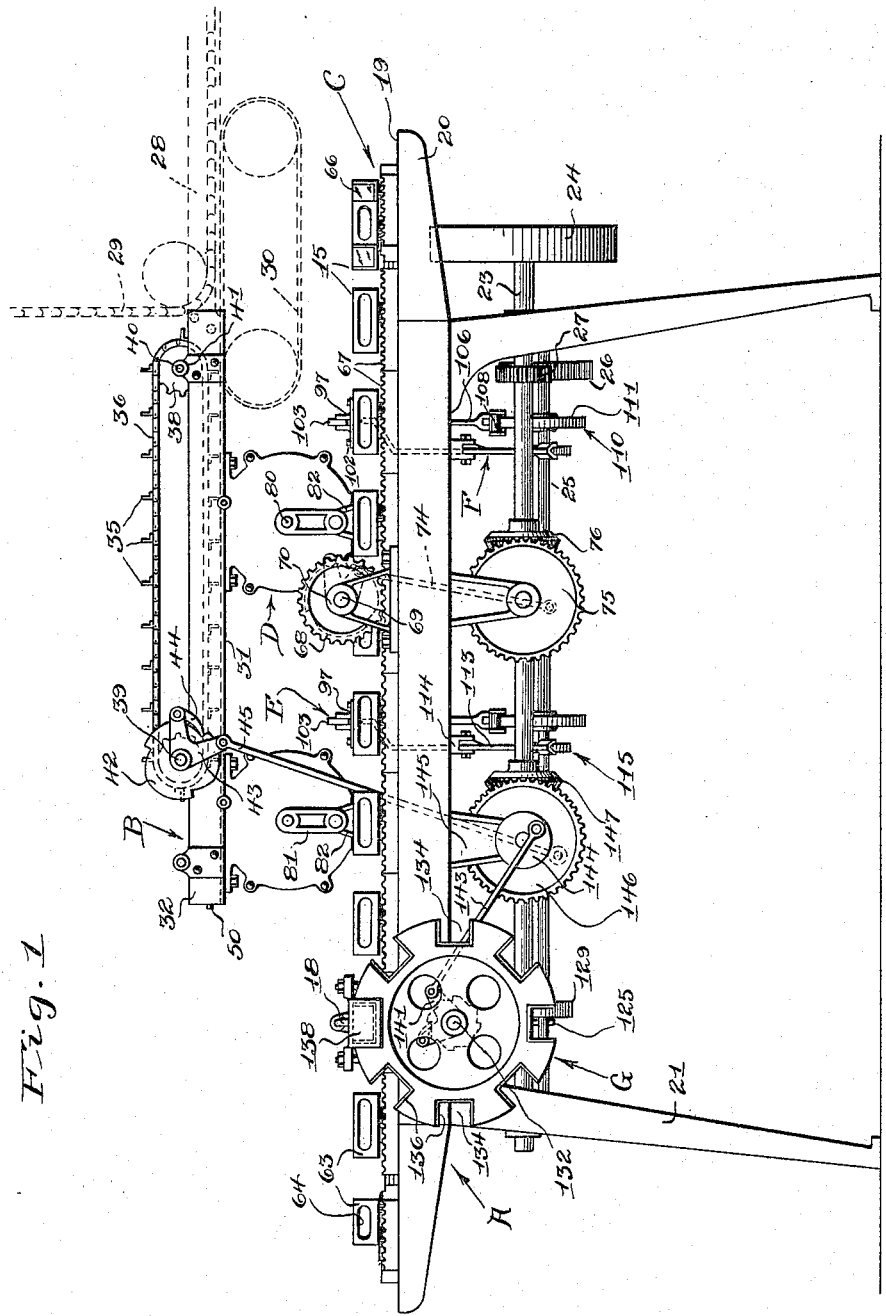
Witnesses
F. C. Caswell
A. M. Ruge
Inventors
Joseph P. Bennett
Mortimer M. Robb
by John E. Shyker, Atty.

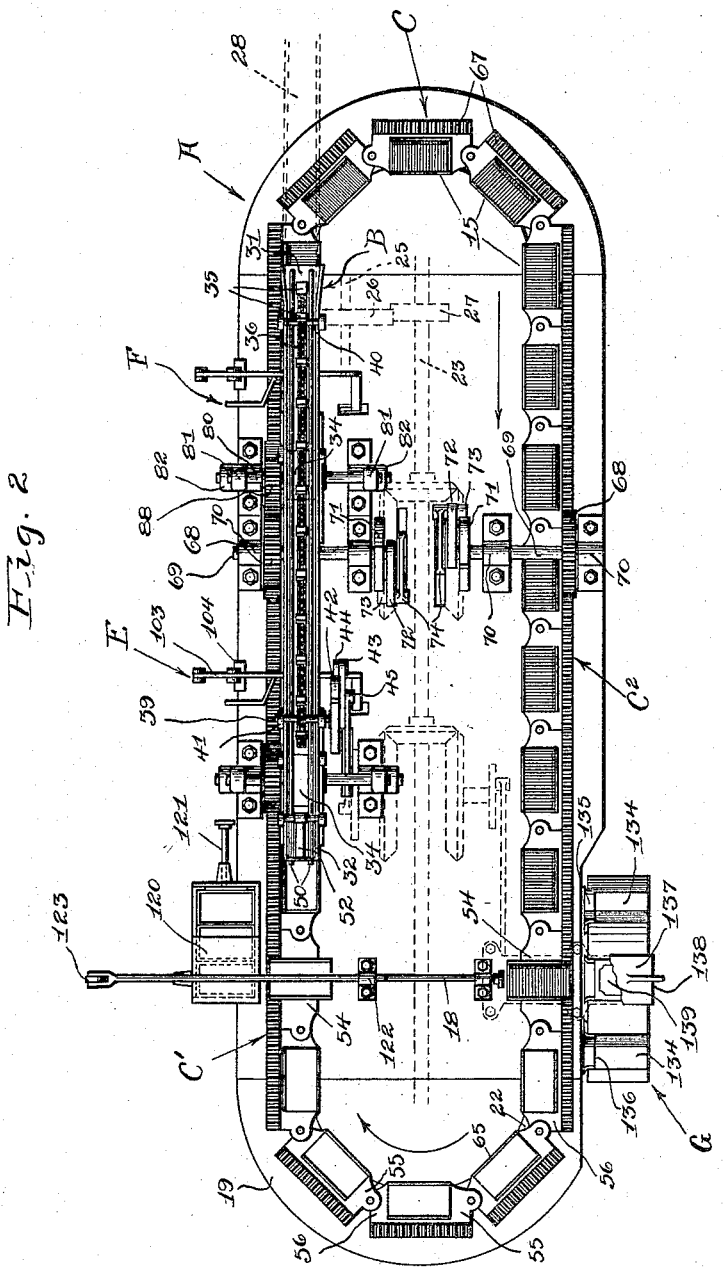

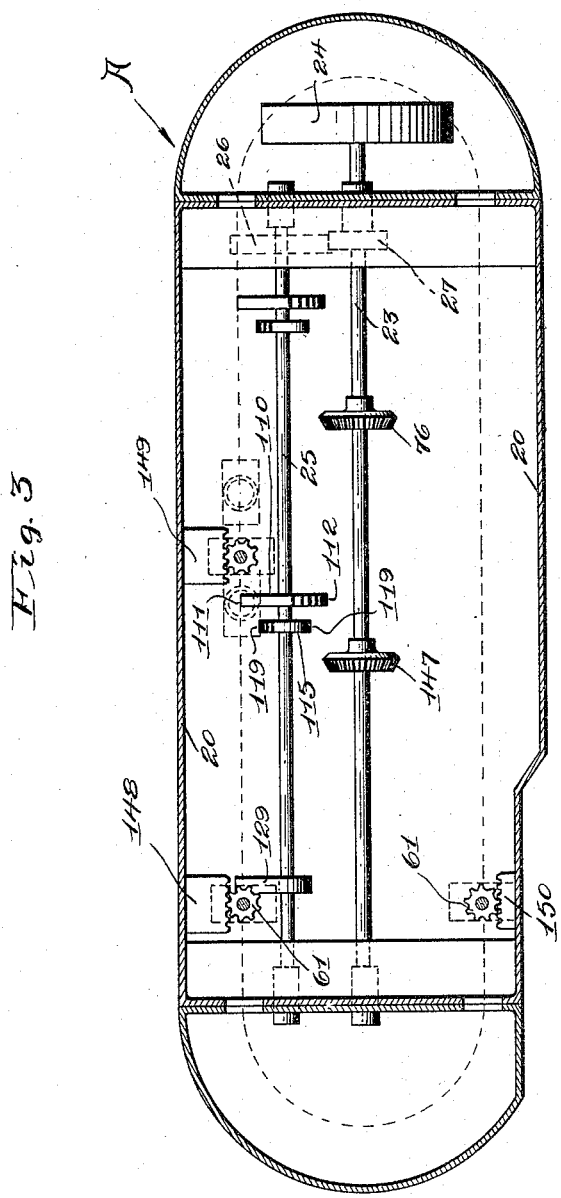

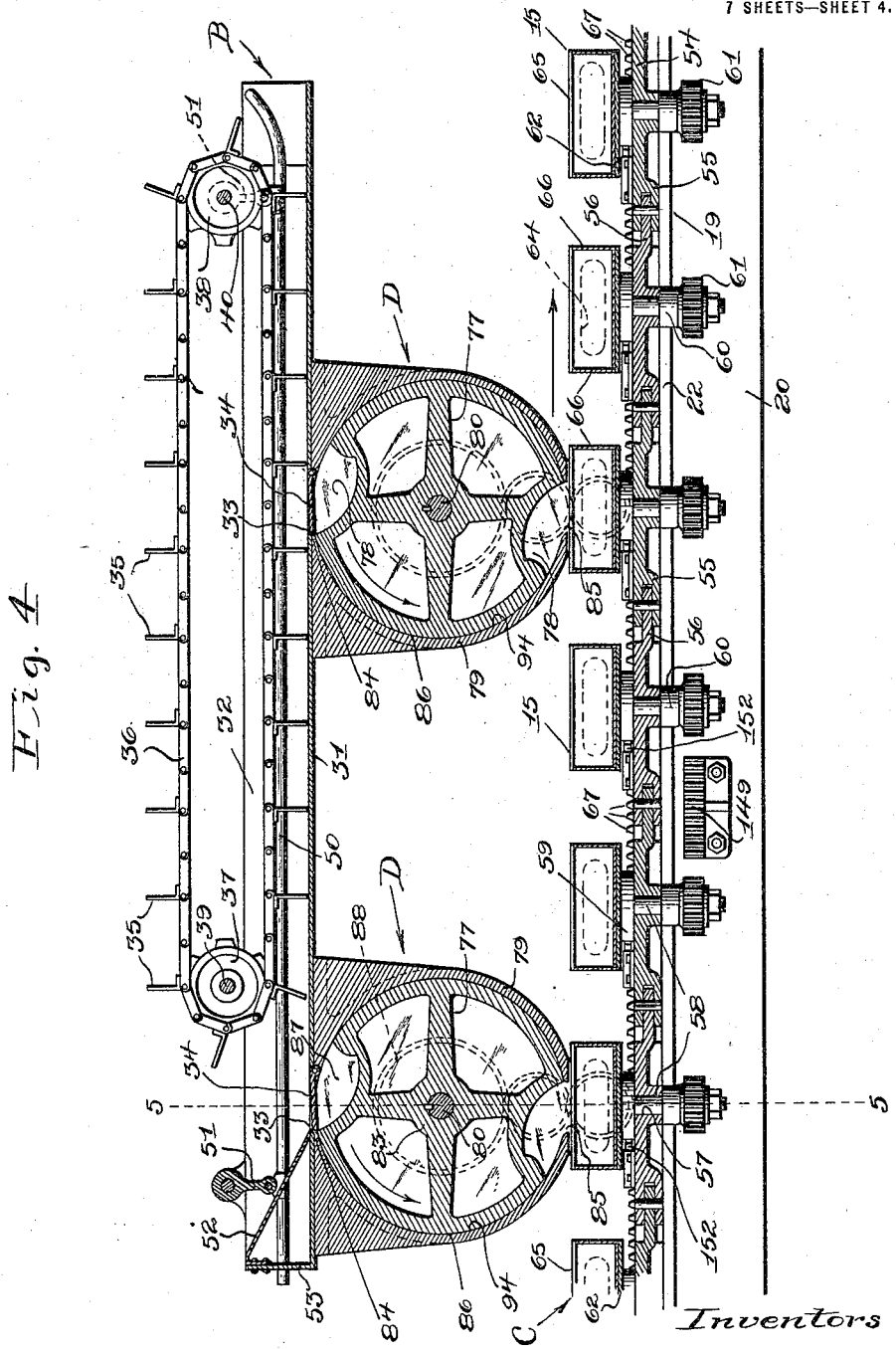

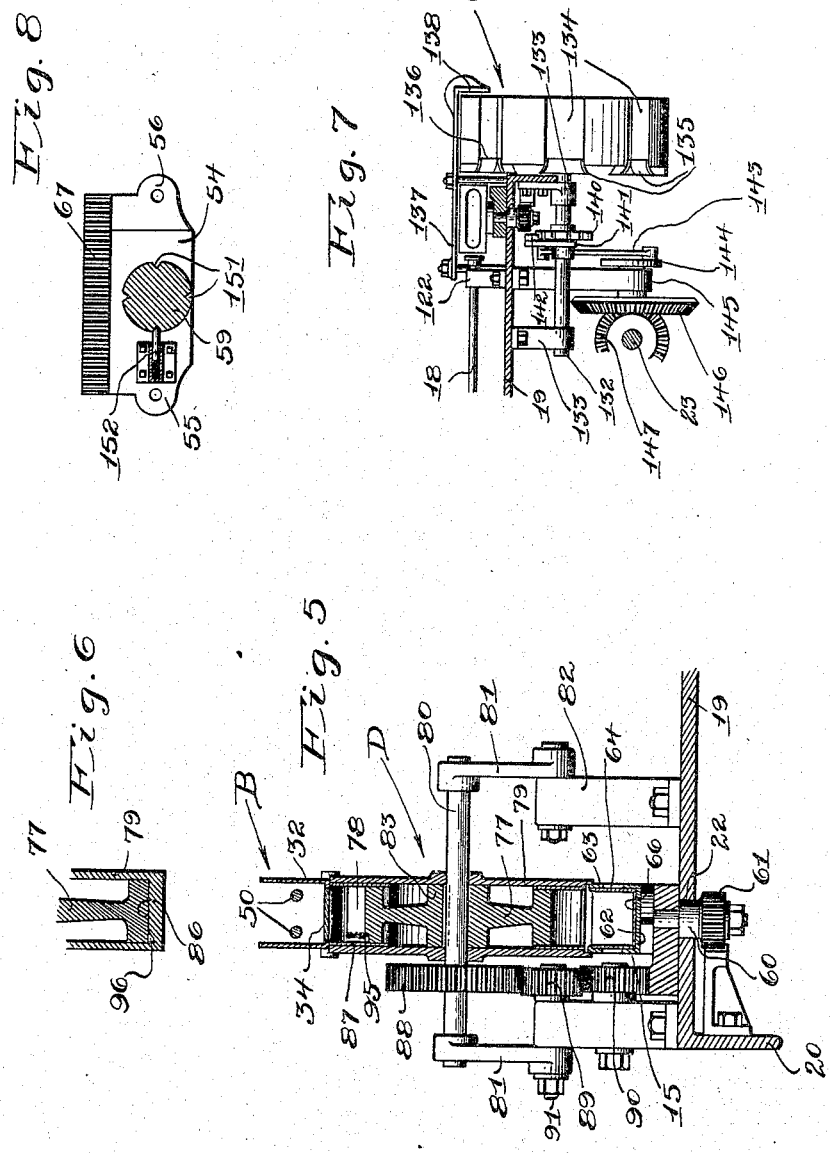

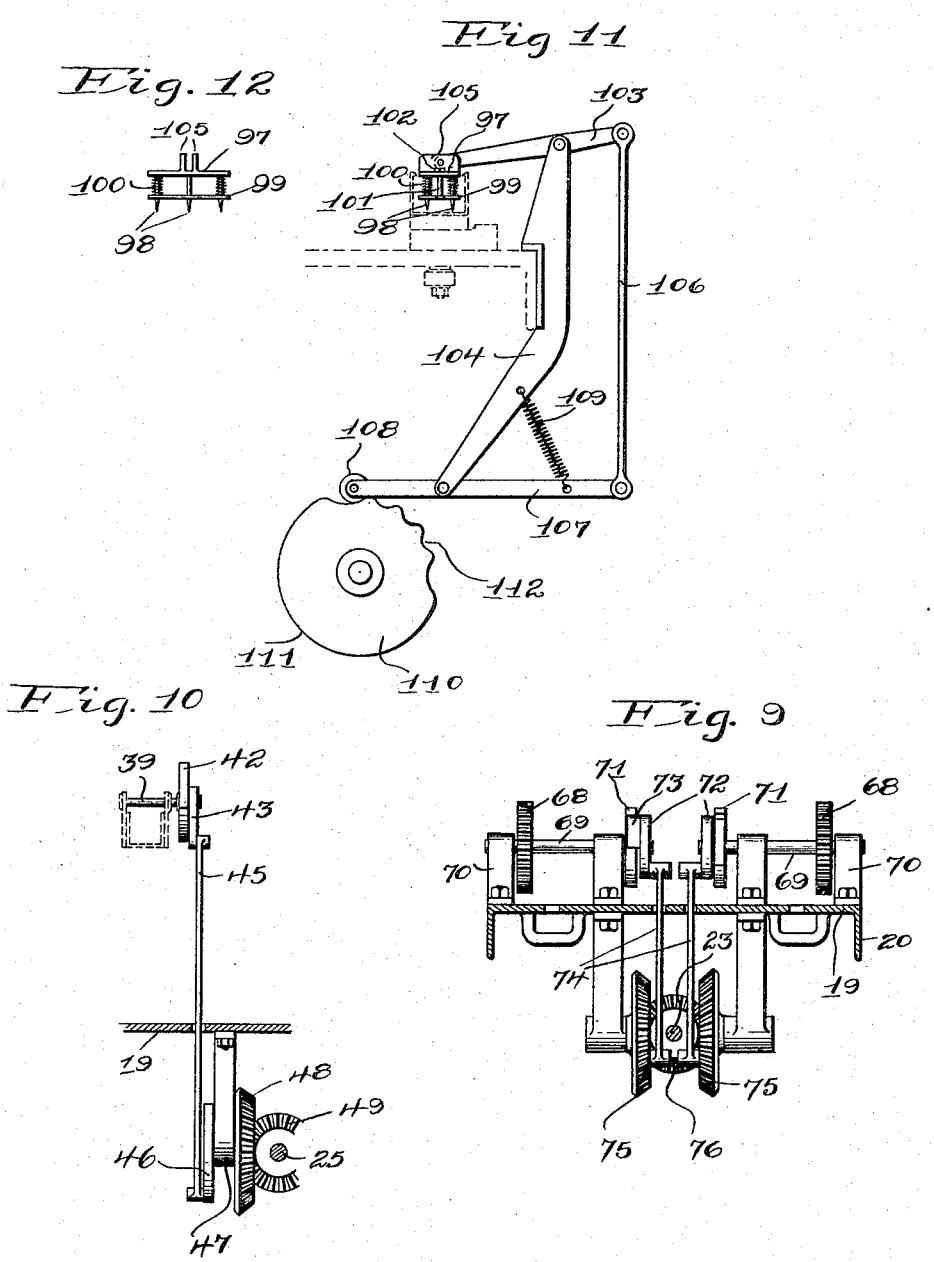

J. P. BENNETT & M. M. ROBB.
MACHINE FOR BOXING MATCHES.
APPLICATION FILED MAR. 22, 1915.

1,175,521.

Patented Mar. 14, 1916.
7 SHEETS—SHEET 7.

Witnesses
J. C. Caswell
A. M. Ruge

Inventors
Joseph P. Bennett
Mortimer M. Robb
by John E. Stryker Atty

UNITED STATES PATENT OFFICE.

JOSEPH P. BENNETT AND MORTIMER M. ROBB, OF DULUTH, MINNESOTA, ASSIGNORS TO UNION MATCH COMPANY, OF DULUTH, MINNESOTA, A CORPORATION OF MINNESOTA.

MACHINE FOR BOXING MATCHES.

1,175,521.     Specification of Letters Patent.     Patented Mar. 14, 1916.

Application filed March 22, 1915. Serial No. 16,123.

*To all whom it may concern:*

Be it known that we, JOSEPH P. BENNETT and MORTIMER M. ROBB, citizens of the United States, residing at Duluth, in St. Louis county, in the State of Minnesota, have invented new and useful Improvements in Machines for Boxing Matches, of which the following is a specification.

Our invention relates to improvements in machines for boxing matches.

It is especially, though not exclusively, adapted for use in connection with a match making machine of the type which employs endless carriers for dipping, drying and continuously delivering the matches. Its object is to provide simple, durable and efficient means whereby box-trays may be expeditiously and compactly filled with matches.

A further object is to provide a packing machine adapted to receive matches in bulk with their heads pointing in the same direction and deliver measured quantities thereof in parallel relation at two or more points of discharge, together with a conveyer furnished with revoluble holders for box-trays, said conveyer being arranged to successively present box-trays at the points of discharge, for the reception of matches, and reverse each tray between said points of discharge, whereby said trays are supplied with a plurality of layers of matches, the matches in one layer being reversed end-for-end with respect to the matches in the next layer.

A further object is to provide in a packing machine of this kind simple and efficient means for inserting empty box-trays in the tray-holder and for removing the filled box-trays from said holders and placing the same in their shucks.

Our invention also includes various novel features of construction, which are hereinafter particularly described, and pointed out in the claims.

Figure 14:
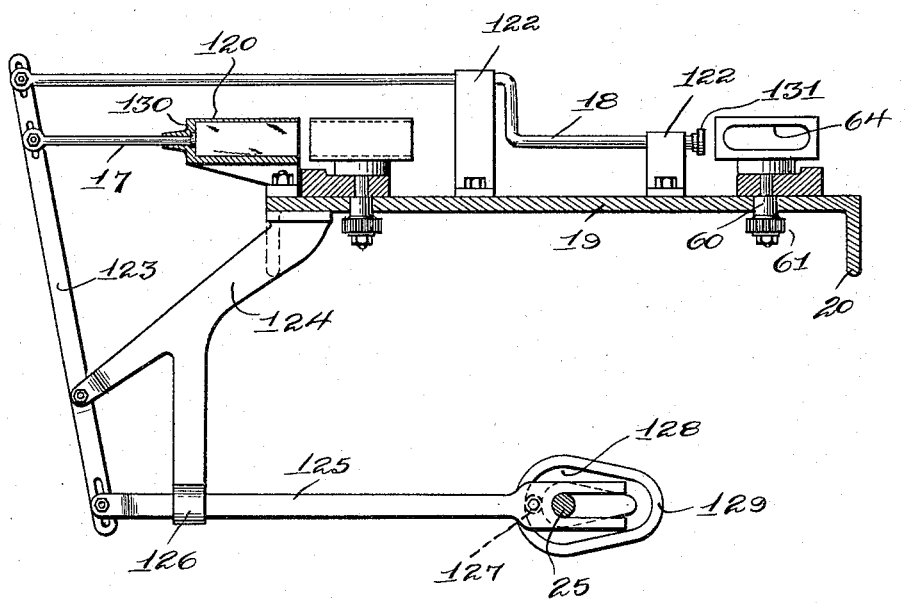
Figure 13:
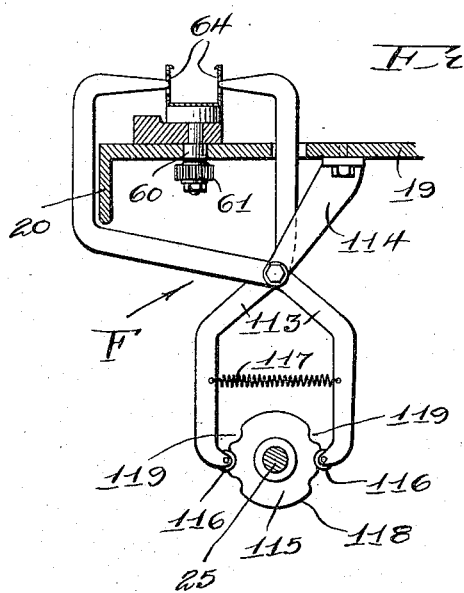

In the drawings, Figure 1 is a side elevation of our improved machine and shows in dotted lines conventional means for supplying the hopper with matches in bulk; Fig. 2 is a plan view thereof, a part of the tray-holder and shuck assembling device being shown in dotted lines; Fig. 3 is a horizontal sectional view in detail, taken through depending flanges of the tables; Fig. 4 is a vertical longitudinal sectional view in detail taken through the hopper, rotary feeding devices and a portion of the box-tray conveyer; Fig. 5 is a vertical transverse sectional view in detail taken on the line 5—5 of Fig. 4, and illustrates one of the rotary feeding devices and its driving mechanism; Fig. 6 is a transverse sectional view in detail taken through the periphery of one of said filling devices; Fig. 7 is an elevation illustrating the shuck carrier and driving mechanism therefor, together with a part of the plunger for inserting the box-trays in the shucks; Fig. 8 is a plan view in detail of one of the conveyer links, and includes a sectional view of a turn-table and a yielding plunger stop therefor; Fig. 9 is an elevation in detail of the driving mechanism for the box-tray conveyer; Fig. 10 is a detail elevation of the driving mechanism for the match moving means within the hopper; Fig. 11 is an elevation of the leveler for settling matches in the box-trays; Fig. 12 is a side view in detail of the leveler head employed in said mechanism; Fig. 13 is an elevation illustrating the tray-tapping device, which is employed to facilitate settling the matches in the box-trays, and Fig. 14 is an elevation showing the mechanism employed in placing box-trays within the holders on the box-tray conveyer, and also the mechanism for pushing the box-trays from said holders into their shucks.

The machine illustrated in the accompanying drawings, as an embodiment of our invention, consists primarily of a supporting table A; a hopper B, adapted to receive matches from the machine in which they are made; a horizontally movable conveyer C, beneath the hopper and provided with individually rotatable tray-holders 15; transfer or tray-filling devices D, adapted to deliver measured quantities of matches from said hopper to the several box-trays; levelers E (Fig. 11) serving to parallelize and settle the matches within the box-trays; tray-tapping devices F (Fig. 13) so placed as to further settle the matches in said trays; a plunger 17 arranged to insert box-trays in the tray-holders of the conveyer; a second plunger 18 to remove said trays from said holders, and a shuck carrying drum G arranged to present shucks for the reception of filled box-trays, as they are removed from said conveyer.

The table A includes a top 19 having downturned flanges 20 at its edges and supporting legs 21. An endless slot or way 22, which in plan is oblong with curved ends, is formed in said table top to serve as a run-way for the antifriction rollers of the conveyer C, hereinafter described. A power-shaft 23 extending longitudinally with respect to the table A is revolubly supported upon the legs 21 and is supplied with a pulley 24, which may be driven by any suitable source of power. A countershaft 25, parallel with said power-shaft is also revolubly supported upon the legs 21 of the table and is provided with a gear wheel 26 in mesh with a gear wheel 27 on said power-shaft.

We have indicated in dotted lines in Fig. 1 a trough 28 of ordinary design, which receives matches from the usual match carrier, not shown, and has imparted thereto a rapid longitudinal reciprocating movement. 29 and 30 indicate common forms of carriers employed to convey matches within the trough 28 and deliver the same therefrom. The trough 28 opens into the hopper B of our improved machine and delivers matches sidewise into said trough in parallel relation and with their heads presented in one direction. Said hopper B is firmly secured to said trough 28 and vibrates longitudinally therewith. This hopper is a long horizontal container having a flat bottom 31 and vertical sides 32, the bottom being formed with two openings 33 supplied with gates or traps 34, which are opened and closed as will hereinafter appear.

Matches are pushed from the mouth of the hopper toward the openings 33 by depending blades 35 on a power-driven sprocket chain 36, arranged longitudinally with respect to said hopper. Said chain 36 passes over sprocket wheels 37 and 38, carried respectively on shafts 39 and 40 revoluble in bearings 41 on said hopper. The shaft 39 is provided with a ratchet wheel 42 and a pivoted bell crank 43, one arm of said bell crank being supplied with a dog 44 adapted to engage said ratchet wheel 42. This bell crank is oscillated by a connecting rod 45 attached to one arm thereof and to a crank wheel 46, said crank wheel being revoluble in a bearing 47 beneath the table top 19 and driven by a bevel gear 48 in mesh with a bevel gear 49 on the counter-shaft 25.

The hopper B is jarred or rapidly reciprocated from end to end, as above mentioned, such jarring movements being employed to compactly mass the matches within the hopper. To facilitate this operation two parallel horizontal rods 50 are suspended within the hopper B by links 51, said rods being formed with upwardly curved ends, which are in the mouth of said hopper. These rods 50 rest on the ends of the matches of the upper layer, and the weight thereof levels and straightens the matches within the vibrating hopper. As indicated in the drawing, the rods 50 pass on either side of the sprocket chain 36 and are free to rise and fall to adjust themselves to the quantity of matches in the hopper. At the end of the hopper a stop 52, to prevent an overflow of matches, is inclined upwardly between the rods 50, from the edge of the second opening 33 to the end wall 53 of the hopper, upon which it is secured.

The box-tray conveyer is made up of an endless series of links 54 slidable upon the table top 19 and having revoluble box-tray holders thereon. Each link comprises a flat oblong block, formed with perforated horizontal lugs 55 and 56 at opposite ends thereof, the lug 55 being bifurcated to receive between its upper and lower members the lug 56 of the next adjacent link. In a central bore 57 in said block is carried a vertical pivot 58 having a disk-shaped head 59 resting and adapted to turn upon the upper face of said block. An anti-friction roller 60 and a toothed wheel 61 are assembled on said pivot beneath said block. The roller 60 is arranged to travel in the run-way 22 in the table top 19, and the toothed wheel 61, rigidly fixed upon said pivot, is designed to mesh with stationary gear racks hereinafter described, and turn said pivot. A box-tray holder 15, including a bottom 62, with upright side flanges 63, rests upon the revoluble disk-shaped head 59, which forms a turn-table for the tray-holder. Said side flanges 63 have large horizontal slots 64 therein and are supplied at their upper edges with tray-retaining ribs 65. It will thus be seen that a box-tray 66 inserted endwise between the sides 63 of the holder 15 rests upon the bottom 62 thereof, and the upper edges of the tray are overlapped by said retaining ribs.

Each link 54 is formed with a row of transverse teeth 67 at the outer margin on its upper side. Said links, guided by the rollers 60, follow the way 22 and travel in straight paths at both sides of the table. The teeth 67 of the links lying in either path, form continuous racks, which mesh with gear wheels 68. Said gear wheels are each fixed upon a shaft 69 revoluble in alined bearings 70 on the table top. The inner end of each shaft is supplied with a ratchet wheel 71 fixed thereto and also carries a pivoted bell crank 72 provided with a dog 73 adapted to engage and turn the adjacent ratchet wheel. Separate connecting rods 74 are pivotally secured to each bell crank for oscillating the same, and are attached to the faces of bevel gears 75, which mesh with opposite sides of a bevel gear 76 on the power-shaft 23. Said ratchet wheels 71 are arranged to turn in opposite directions and reverse the rotation of the gear wheels 68, whereby the run C' of the conveyer is impelled in one direction and the run C² of said conveyer in the other direction. By this arrangement power is simultaneously applied on both sides of the conveyer at intervals and efficiently drives said conveyer step by step.

Between the vibrating hopper B and the conveyer C are located filling devices D, which are essentially, vertically rotatable wheels 77 provided with pockets 78 adapted to receive a quantity of matches equal to half of the number required to fill a box-tray of given size. These feeding devices are provided with housings 79, which form oscillating supports for the vibrating hopper B and are located directly above the run C' of the conveyer. The wheel 77 is mounted upon a shaft 80 journaled in the ends of upright links 81, which are pivoted upon standards 82, resting upon the table top 19. This shaft 80, journaled in the sides of the housing 79, supports the same and is keyed to the hub 83 of the wheel 77. The housing 79 has in its top an inlet port 84 communicating with an opening 33 in the floor of the hopper, and immediately above the conveyer C in the lower portion of this housing is an outlet port 85 leading to the box-trays on the conveyer C. The sides of the wheel 77 fit closely against the housing 79 and the periphery thereof fits snugly against the annular wall 86 of said housing. The above mentioned pockets 78 are formed in the periphery of said wheel with side walls 87 and are diametrically opposite to each other. Matches fall by gravity from the hopper into these pockets when they register with the inlet port and are retained in said pockets by the annular wall 86 of the housing 79 until the pockets severally register with the outlet port 85, whereupon said matches fall into a box-tray beneath said outlet port. The wheel 77 is driven in a counter-clockwise direction, as seen in Fig. 4 and is geared to the teeth 67 of the link 54 beneath said wheel, by a train of gear wheels 88, 89 and 90. The gear wheel 88, fixed on the shaft 80, is driven through the idler gear wheel 89, mounted on the shaft 91, pivotally connecting a link 81 and standard 82, and said idler gear wheel 89 is driven by the gear wheel 90 (mounted on a standard 82), which meshes with the teeth 67 of the conveyer links 54. These gears are so proportioned that registration of a filled pocket with the outlet port 85 begins as the end of a box-tray passes beneath said port, so that the matches falling from said pocket are distributed substantially throughout the length of the box-tray. A downwardly swinging gate 34, heretofore mentioned, is employed to close each opening 33 in the hopper B, and when open to form a run-way for matches into the pockets 78 of the wheels 77, as the pockets pass beneath an opening 33. The periphery 94 of each wheel 77 supports a gate 34 and holds it in closed position until the forward edge of a pocket 78 passes the free end of said gate, when said free end drops upon the bottom of the pocket, which is shaped to retard the downward swing of the gate, and thus permit matches to gently slide from the hopper B into the pocket 78 without disturbing their parallel relation. Continued rotation of the wheel 77 then causes the gate 34 to swing upwardly into closed position. To secure this effect without disarranging the matches, the bottom of the pocket gradually curves downwardly and rearwardly from its forward edge throughout nearly the entire length of the pocket, then curves abruptly upward to the periphery of the wheel, to form a steep convex contact surface for the end of the gate at the rear of the pocket. This peculiar formation results in a gradual lowering of the gate and permits the gate to be withdrawn from the pocket, as the same is closed, without disturbing the matches in the pocket. The bottoms of the pockets 78 and the annular wall 86 of the housing 79 are formed with grooves 95 and 96 to receive the heads of matches and prevent the frictional contact thereof with adjacent surfaces as the wheels 77 turn.

Adjacent to the path of the conveyer C, and immediately following each filling device, we provide a leveler E and box-tapping mechanism to straighten and settle each charge of matches received by a box-tray. Each leveler E consists of a cap plate 97 provided with dependent fingers 98 and a pressure plate 99 slidable vertically on said fingers; said pressure plate is yieldingly held away from the cap-plate 97 by means of helical springs 100 coiled about the fingers 98 and the limit of expansion of these springs is fixed by a stop bolt 101, the lower end of which is attached to the pressure plate, its shank sliding through the cap-plate 97 and its upper end being provided with a nut 102 to restrict downward movement. Each of these levelers E depends from a lever 103, which is pivoted near its center on a bracket 104 attached to the table A and is provided with means for plunging the fingers 98 into a passing box-tray, for rapidly vibrating said leveler within such tray and for withdrawing the leveler from the tray. The means which we employ for these purposes are as follows: The lever 103, above mentioned, is attached at one end to the ears 105 on the cap-plate 97, and the other end of said lever is connected by a link 106 with an arm 107 also pivoted near its center on the lower end of said bracket. The free end of this arm 107 is furnished with a roller 108, which is yieldingly held by the spring 109 in contact with the face of a cam 110 on the countershaft 25. Said cam has a regular high surface 111 and an undulating low surface 112. When the roller 108 travels upon this high surface the leveler is held above the path of the box-trays and when said roller travels over the undulating low surface 112, the leveler is lowered into the box-tray and vibrated rapidly up and down until the roller 108 reaches the high surface, when said leveler is again removed from the tray. During the vibration of the leveler the fingers 98 pass down between the splints and straighten any of the matches that may be askew and the pressure plate 99, bearing down upon the matches, yieldingly presses them together. To assist in this packing operation we supply box-tapping means F (to vibrate the box-trays) which operate simultaneously with the levelers E. Each tapping device comprises a pair of crossed arms 113 pivoted at their intersection on a bracket 114, secured beneath the table, said arms being arranged with their upper ends on opposite sides of the path of the tray-holders 15 and their lower ends on opposite sides of a cam 115 on the countershaft 25. The upper ends of said arms are adapted to protrude through slots 64 in the sides 63 of the tray-holders 15, and the lower ends are supplied with rollers 116 yieldingly held against the face of said cam 115 by the coiled spring 117 stretched between said arms. The cam 115 has opposite regular surfaces 118 and opposite undulating surfaces 119, the depressions in the undulating surfaces being lower than the regular surfaces. When the rollers 116 pass over the regular surfaces 118, the arms 113 are stationary and the upper ends thereof are removed from the path of the tray-holders, but when said rollers pass over the undulating surfaces 119 of the cam 115 the upper ends of said arms are moved rapidly back and forth through the slots 64 in a tray-holder and caused to tap the sides of the box-tray therein contained.

The loading station for trays, at one side of the table, consists of a box or receptacle 120 open at the top and at one end, the open end being adjacent to the path of the conveyer C. Box-trays are inserted through the top opening of this receptacle in any convenient manner and are shifted transversely to loading position by suitable means, such as the hand-operated plunger 121, shown in Fig. 2.

An automatically operated device is employed to push empty box-trays from this loading station into tray-holders in the run C' of the conveyer, and also to eject filled box-trays from the run C² of the conveyer. A plunger rod 17, slidable in the closed end of the receptacle 120 and a plunger rod 18, slidable in the bearings 122, on the table top 19, extend transversely with respect to the conveyer C. Each of said rods has a slidable pivotal connection with a lever 123, tiltable on a bracket 124 depending from the table-top 19. Said lever also has a slidable pivotal connection with one end of a reciprocating bar 125, which is mounted in a bearing 126 on said bracket, and bifurcated at one end to form a slidable bearing on the countershaft 25. This reciprocating rod is supplied with a roller 127 arranged to travel in the cam-way 128 of a cam 129 on said countershaft, and said rod is shifted backward and forward by said roller to rock the lever 123 and reciprocate the plunger rods 17 and 18. These rods are respectively furnished with heads 130 and 131, the former being adapted to bear against the end of a box-tray and push the same from the receptacle 120 into the adjacent tray-holder while the latter is arranged to bear against the end of a filled box-tray and push it from the tray-holder.

We provide means for assembling the filled box-trays in shucks as said trays are removed from the conveyer. A drum G on the shaft 132, revoluble in bearings 133 depending from the table-top 19, is supplied with peripheral transverse grooves 134, each groove being adapted to snugly receive a shuck and present an open end thereof to the end of a filled box-tray about to be discharged from the conveyer. Flared guides 135 are inserted in the inner ends of each groove 134 to direct a box-tray into a shuck. The inner ends of said flanges form vertical shoulders 136 against which the ends of the bottoms and sides of a shuck abut. To facilitate directing a box-tray into a shuck, and to hold the shuck in its groove while the tray is being inserted therein, we provide an upper guide-plate 137 secured to the table top 19 by bolts, or the like, said plate being formed with an abutment 138 depending therefrom to obstruct the outer end of the groove 134 at the top of the drum G. Said drum is driven step by step with the conveyer C and empty shucks 139 are inserted in grooves on one side of the plate 137 and the assembled shucks and box-trays are removed at the other side of said plate. The intermittent rotation of the shuck carrying drum is secured by the following mechanism. A ratchet wheel 140 is fixed upon the drum supporting shaft 132 and a bell crank 141 is pivoted thereon. Said bell crank is furnished with a dog 142 arranged to engage the ratchet wheel 140 and is connected by the rod 143 with the crank wheel 144, said crank wheel being revolubly supported by the bearing 145, and rotated by the bevel gear 146 in mesh with the bevel gear 147 on the power-shaft 23.

The conveyer propelling mechanism is designed to shift the conveyer step by step a distance equal to the length of one conveyer link, thus presenting a new box-tray to the various devices above described, which are distributed at intervals around the margin of the table. Before reaching the position wherein empty box-trays are inserted in the tray-holders, said tray-holders are turned one-quarter of a revolution by the engagement of the passing toothed wheels 61 with the stationary rack 148 (see Fig. 3) on the flange 20 of the table, so that said holders rest transversely on the conveyer to receive empty box-trays from the loading station. Said rack 148 is designed also to turn said holders to longitudinal position on the conveyer after receiving said empty box-trays. A similar rack 149 (see Fig. 3), fixed upon the table between the filling devices D, engages said toothed wheels and turns the tray-holders end-for-end on the conveyer. A third rack 150 (see also Fig. 3) is located on the opposite side of the table and first turns the tray-holders transversely on the conveyer, whereby the filled box-trays may be discharged by the plunger 18, then continues the revolution of said holders until they again reach longitudinal positions on the conveyer.

To prevent the tray-holders from resting in other than exact transverse and longitudinal positions on the conveyer, which irregularity might result from the wearing of parts, we have formed V-shaped notches 151 at intervals of ninety degrees in the periphery of the disk-shaped head or turn-table 59 of each conveyer link 54, and upon each link have placed a pointed spring pressed plunger 152 (see Fig. 8), which enters one of the notches 151 as the tray-holder nears a position of rest. Said plunger 152 tends to hold the turn table in (or turn it slightly toward) proper position, but yields readily when said table is turned by the power mechanism.

In operation, matches are fed into the hopper B from the vibrating trough 28 and conveyed along the hopper B above the gates 34 by the blades 35 on the sprocket chain 36. Said trough imparts an endwise jarring movement to the hopper B and also shakes the oscillatory filling devices D (see Fig. 5) supporting said hopper. The box-tray conveyer C and the shuck carrying drum G are propelled in unison step by step. The movement of said conveyer causes the turning of the box-tray holders thereon as well as the rotation of the wheels 77 of the filling devices. When the conveyer is at rest the following operations are performed: An empty box-tray is inserted in a tray-holder by the push-rod 17; a filled box-tray is removed from a tray-holder and shoved by the push-rod 18 into the waiting shuck 139 in the top of the drum G and the last charges from the filling devices D are compactly and uniformly arranged in their box-trays by the levelers E and tappers F. During each forward impulse of the conveyer, a tray-holder is moved and turned to receive an empty box-tray, and another tray-holder is similarly moved and turned to permit the removal of a filled box-tray; the wheels 77 of the filling devices are turned a partial revolution to empty the contents of a pocket 78 into the box-tray beneath it and a tray-holder 15 between said filling stations is turned end-for-end by its turn-table, so that the layer of matches later to be received from the second filling device will lie with heads reversed with respect to the layer of matches received from the first filling device.

Having described our invention, what we claim as new and desire to protect by Letters Patent is:

1. In a machine for boxing matches, means for delivering matches at different discharge stations, a traveling conveyer carrying a plurality of horizontally revoluble tray-holders, said conveyer being adapted to move intermittently beneath said discharge stations and first present each tray-holder at one station, then present it at another station, and means for driving and synchronizing the movements of said delivery mechanism and conveyer.

2. In a machine for boxing matches, means for delivering matches at different points of discharge in substantially parallel relation, with their heads extending in the same direction, an endless series of pivotally connected links beneath said delivering means, each link having a horizontally revoluble box-tray holder thereon, mechanism for intermittently and simultaneously driving said delivering means and series of links, the latter being adapted to present each tray-holder beneath one discharge position, and then another, and means for turning said tray-holders, between the different stations.

3. In a machine for boxing matches, a traveling conveyer consisting of an endless series of links, each link having a revoluble holder thereon adapted to receive a box-tray, means for delivering matches in measured quantities to box-trays in said holders at a plurality of positions, means for propelling said conveyer step-by-step to present the tray-holders beneath said discharge positions and means for turning said holders, between said filling positions, during each step of the conveyer.

4. In a machine for boxing matches, the combination with a match hopper of an endless carrier provided with a series of horizontally revoluble tray-holders, a pair of vertically revoluble filling devices and means for coördinating the movements of said tray-holders and filling devices.

5. In a machine for boxing matches, a horizontal support having an endless way therein, a conveyer comprising an endless series of pivotally connected links slidable upon said support, each link being supplied with a vertically revoluble pivot carrying a tray-holder above the link and a roller bearing beneath said link, said roller bearing being adapted to travel in said way and direct the movement of the link, filling devices for supplying quantities of matches to said trays while traveling in the same straight course and means for rotating the pivots between said filling devices to turn said tray-holders end for end.

6. In a machine for boxing matches, a horizontal support having an endless way therein, filling devices arranged to discharge measured quantities of matches at successive stations, a power-driven box-tray conveyer on said support adapted to present box-trays in succession beneath the discharge stations, said conveyer comprising an endless series of pivotally connected links slidable on said support (each link having a vertical shaft revoluble therein, a turn-table secured to said shaft and revoluble upon said link, a holder on the turn-table to receive a box-tray, an anti-friction roller on the shaft adapted to travel in said way and a toothed wheel fixed on said shaft) and a stationary rack adapted to engage the passing toothed wheels on said links and turn the box-trays end-for-end in their travel between said filling devices.

7. In a machine for boxing matches, a horizontal support having an endless way therein, filling devices arranged to discharge measured quantities of matches at successive stations, a power-driven box-tray conveyer on said support adapted to present box-trays in succession beneath the discharge stations, said conveyer comprising an endless series of pivotally connected links slidable on said support (each link having a vertical shaft revoluble therein, a turn-table secured to said shaft and revoluble upon said link, a holder on the turn-table to receive a box-tray, a roller on the shaft adapted to travel in said way and a toothed wheel fixed on said shaft), a stationary rack adapted to engage the passing toothed wheels on said links and turn the box-trays end-for-end in their travel between said filling devices and yielding means for securing said turn-table in predetermined position.

8. In a machine for boxing matches, a longitudinally reciprocating hopper having openings in the bottom thereof and adapted to receive matches in parallel relation, means for moving matches along the bottom of the hopper toward the openings, rods pivotally suspended near their ends within the hopper and adapted to yieldingly bear upon the matches therein to distribute and compactly arrange said matches, a box-tray conveyer beneath said hopper and oscillatory filling devices for receiving quantities of matches from the openings in said hopper and delivering the same into the box-trays in said conveyer, said filling devices forming a movable support for said hopper.

9. In a machine for boxing matches, an endless conveyer having revoluble holders thereon adapted to receive box-trays, said holders resting normally in longitudinal positions with respect to the conveyer, means for pushing box-trays endwise into and out of said holders, means for intermittently supplying said trays with matches and means for turning said holders transversely with respect to the conveyer to receive box-trays and permit the discharge thereof, and also to reverse said box-trays end-for-end after each charge of matches has been received.

10. In a machine for boxing matches, a hopper having openings in the bottom thereof, a box-tray conveyer beneath said hopper and oscillating filling devices supporting said hopper and located one beneath each opening, said filling devices being adapted to receive matches from said hopper, straighten the same and deliver them uniformly into the box-trays of the conveyer.

11. In a machine for boxing matches, the combination of a hopper containing a supply of matches and having openings in the bottom thereof, a conveyer carrying box-trays beneath the hopper, a vertically rotatable filling device for each opening (between the hopper and conveyer) adapted to receive matches from said hopper and deliver a quantity thereof into each box-tray, and means for jarring the box-trays and for bringing the matches into parallel relation therein.

12. In a machine for boxing matches, a hopper with trapped openings in the bottom thereof, a wheel, having an oscillating axis, beneath each of said openings, and a box-tray conveyer beneath the wheels, which are provided with pockets in the periphery thereof adapted to receive matches from said hopper and deliver the same into box-trays on said conveyer.

13. In a machine for boxing matches, a hopper having a trapped opening in the bottom thereof, a wheel formed with pockets in its periphery and revolubly mounted upon an oscillating axis beneath the opening in said hopper, a box-tray conveyer beneath the wheel, and a train of gears between said conveyer and wheel for transmitting motion from the former to the latter, said wheel being adapted to receive quantities of matches from the hopper and deliver them into box-trays on said conveyer.

14. In a machine for boxing matches, a frame, a longitudinally reciprocating hopper formed with openings in its bottom, an endless box-tray conveyer (beneath the hopper) propelled horizontally on said frame, a wheel for each opening (between the hopper and conveyer) having pockets therein adapted to receive matches through the openings in said hopper and discharge the same into box-trays on the conveyer, a housing for each wheel having openings therein to permit the passage of matches to and from said pockets, said housings being arranged to carry the hopper, oscillating supports on the frame for said housings and gearing connecting the conveyer and wheels for turning the latter.

15. In a machine for boxing matches, a hopper with an opening in the bottom thereof, a box-tray conveyer passing beneath said hopper, a vertically revoluble wheel (between the hopper and conveyer) formed with pockets in its periphery, a housing for said wheel having an inner annular wall fitted closely against the periphery of said wheel, said wall being formed with an upper port communicating with the opening in said hopper and a lower port leading to said conveyer, a downwardly swinging gate for the opening in said hopper, normally supported by the periphery of said wheel, and means for turning the wheel whereby said pockets are successively registered with said upper and lower ports.

16. In a machine for boxing matches, a hopper having an opening in its bottom, a box-tray conveyer beneath said hopper, a wheel vertically revoluble between said hopper and conveyer, a downwardly swinging gate for said opening, adapted to normally rest upon the periphery of the wheel, pockets in the periphery of said wheel into which said gate falls to permit the filling of the pockets with matches, and a curved wall fitting against the periphery of the wheel to close the descending pockets until they reach a position immediately above the path of the conveyer, in which position said pockets are uncovered so that the contents thereof fall into a box-tray on said conveyer.

17. In a machine for boxing matches, a hopper formed with an opening in its bottom, an endless conveyer for box-trays beneath said hopper, a vertically revoluble vibrating wheel interposed between said hopper and conveyer and formed with a pocket in its periphery, adapted to register with said opening and receive therefrom a supply of matches, a curved wall fitting against the periphery of said wheel to retain matches within said pocket as it descends and a port in said wall to permit the escape of matches into a box-tray on said conveyer.

18. In a machine for boxing matches, a hopper formed with an opening in its bottom, an endless conveyer for box-trays beneath said hopper, a vertically revoluble wheel interposed between said hopper and conveyer and formed with a pocket in its periphery, adapted to register with said opening and receive therefrom a supply of matches, a curved wall fitting against the periphery of said wheel to retain matches within said pocket as it descends, a port in said wall to permit the escape of matches into a box-tray on said conveyer, and mechanism for simultaneously moving said wheel and conveyer and timing such movement so that matches are distributed throughout the length of said box-tray.

19. In a machine for boxing matches, a hopper having an opening in the bottom thereof and provided with a closure for said opening, a conveyer for box-trays beneath said hopper, a rotary filling device having pockets coöperating with said closure to measure quantities of matches and receive the same from said hopper, said filling device being arranged to discharge said matches immediately above the path of said conveyer and means for driving the conveyer to move said box-trays, during the discharge of matches, whereby said matches will be uniformly distributed from one end of a box-tray to the other.

20. In a machine for boxing matches, a hopper for matches having an opening in its bottom, a wheel formed with a pocket therein adapted to pass beneath said opening, and a hinged gate for the opening normally closed by engagement with said wheel and adapted to swing downward into the pocket to permit the same to be filled with matches, the bottom of said pocket being formed to engage the free end of the gate to time the lowering and raising of said gate.

21. In a machine for boxing matches, a hopper having an opening in its bottom, a conveyer for box-trays, a movable pocket adapted to receive matches in parallel relation from the hopper and discharge them into a box-tray on the conveyer, and a hinged gate for said opening, the free end thereof being adapted to swing downward into said pocket and slide upon the bottom thereof, said bottom being so formed that the tilting of the gate is equalized to permit uniform delivery of the matches.

22. In a machine for boxing matches, an intermittently propelled conveyer carrying box-trays thereon, means for supplying said box-trays with matches, a tiltable arm on either side of the path of said conveyer, said arms being arranged to strike opposite sides of a box-tray, and yielding means for moving said arms when said conveyer is at rest to rapidly and simultaneously tap the opposite sides of said box-trays.

23. In a machine for boxing matches, an intermittently propelled conveyer carrying box-trays thereon, means for supplying matches to said box-trays, a vertically reciprocating leveler provided with fingers, adapted to enter a box-tray and means for vibrating said fingers while said conveyer is at rest, to straighten and compactly arrange in parallel relation the matches within said box-tray.

24. In a machine for boxing matches, an intermittently propelled conveyer carrying box-trays thereon, means for supplying said box-trays with matches, arms arranged to strike the sides of a box-tray when the conveyer is at rest, a leveler provided with fingers adapted to enter the box-tray and penetrate the layer of matches therein and means for simultaneously vibrating the arms and reciprocating said leveler vertically to compactly and uniformly arrange the matches within said tray.

25. In a machine for boxing matches, a conveyer carrying box-trays, means for supplying said box-trays with matches and mechanism for composing and compactly arranging in parallel relation the matches within said trays, said mechanism comprising a vertically reciprocating leveler provided with fingers, adapted to pass into and out of a box-tray, and a plate slidable on said fingers and yieldingly held in contact with the matches.

26. In a machine for boxing matches, a conveyer carrying box-trays, means for supplying said box-trays with matches, mechanism for arranging the matches in parallel relation in said box-trays, said mechanism comprising a vertically movable leveler having depending fingers thereon, and a cam adapted to depress said leveler to insert its fingers between the matches in a box-tray, then vibrate said leveler to straighten and pack the matches and finally lift the leveler to clear the path of the tray.

27. In a machine for boxing matches, vertically rotatable filling devices, means for supplying said devices with matches, an intermittently propelled conveyer carrying box-trays thereon and adapted to first present each tray in position to receive a measured quantity of matches from one filling device, then turn said tray end-for-end and present it in position to receive an additional quantity of matches from another filling device, and means for distributing and compactly arranging in parallel relation the matches within said trays, said last mentioned means comprising a vertically reciprocating leveler provided with fingers, adapted to pass into and out of a box-tray, and a plate slidable on said fingers and yieldingly held in contact with the matches.

28. In a machine for boxing matches, vertically rotatable filling devices formed with pockets for matches and provided with a housing adapted to close said pockets at intervals in the rotation of the filling device, a hopper, formed with trapped openings in its bottom and supported by said housing, for supplying said pockets with matches, an intermittently propelled conveyer carrying box-trays thereon beneath said filling devices and adapted to first present each tray in position to receive a measured quantity of matches from one pocket, then turn said tray end-for-end and present it in position to receive an additional quantity of matches from a pocket in another filling device, and means for distributing and compactly arranging the matches within said trays, said last mentioned means comprising a vertically reciprocating leveler provided with fingers, adapted to pass into and out of a box-tray between the matches, and a plate slidable on said fingers and yieldingly held in contact with the matches.

29. In a machine for boxing matches, vertically rotatable filling devices formed with pockets for matches and provided with a housing adapted to close said pockets at intervals in the rotation of the filling device, a hopper, formed with trapped openings in its bottom and supported by said housing, for supplying said pockets with matches, an intermittently propelled conveyer carrying box-trays thereon beneath said filling devices and adapted to first present each tray in position to receive a measured quantity of matches from one pocket, then turn said tray end-for-end and present it in position to receive an additional quantity of matches from a pocket in another filling device, and means for distributing and compactly arranging the matches within said trays.

In testimony whereof, we have signed our names to this specification in the presence of two subscribing witnesses.

JOSEPH P. BENNETT.
MORTIMER M. ROBB.

Witnesses:
CHAUNCEY E. HAGEN,
PHILIP L. RAY.

Copies of this patent may be obtained for five cents each, by addressing the "Commissioner of Patents, Washington, D. C."